(12) United States Patent
Liu et al.

(10) Patent No.: US 12,345,921 B2
(45) Date of Patent: Jul. 1, 2025

(54) SILICON-BASED INTEGRATED OPTICAL CHIP

(71) Applicant: SiFotonics Technologies (Beijing) Co., Ltd., Beijing (CN)

(72) Inventors: Yadong Liu, Beijing (CN); Pengfei Cai, Beijing (CN); Tzung-I Su, Beijing (CN)

(73) Assignee: SiFotonics Technologies (Beijing) Co., Ltd., Beijing (CN)

( * ) Notice: Subject to any disclaimer, the term of this patent is extended or adjusted under 35 U.S.C. 154(b) by 185 days.

(21) Appl. No.: 17/983,210

(22) Filed: Nov. 8, 2022

(65) Prior Publication Data
US 2024/0151899 A1    May 9, 2024

(51) Int. Cl.
*G02B 6/136* (2006.01)
*G02B 6/12* (2006.01)
*G02F 1/025* (2006.01)

(52) U.S. Cl.
CPC ......... *G02B 6/136* (2013.01); *G02B 6/12004* (2013.01); *G02F 1/025* (2013.01); *G02B 6/12002* (2013.01); *G02B 2006/12061* (2013.01); *G02B 2006/12142* (2013.01)

(58) Field of Classification Search
CPC ........ G02B 6/12002; G02B 6/12004; G02B 6/136; G02B 2006/12002; G02B 2006/12061; G02F 1/025
See application file for complete search history.

(56) References Cited

U.S. PATENT DOCUMENTS

| | | | |
|---|---|---|---|
| 9,136,672 B2 * | 9/2015 | Luo | B82Y 20/00 |
| 9,671,557 B1 * | 6/2017 | Ding | G02B 6/136 |
| 9,864,138 B2 * | 1/2018 | Coolbaugh | H01L 31/02327 |
| 10,270,222 B2 * | 4/2019 | Menezo | H01S 5/1071 |
| 11,788,841 B2 * | 10/2023 | Paniccia | G02B 6/126 385/129 |
| 2023/0194789 A1 * | 6/2023 | Virot | G02B 6/132 385/14 |
| 2023/0314707 A1 * | 10/2023 | Scofield | G02B 6/1223 385/43 |

* cited by examiner

Primary Examiner — Daniel Petkovsek

(57) ABSTRACT

The present invention provides a silicon-based integrated optical chip integrating a silicon-based optical modulator and a germanium-silicon detector and a preparation method thereof. A position and dimension of a silicon nitride waveguide are defined by a slot formed by using an etching process, then surplus silicon nitride is removed by means of chemico-mechanical polishing, and an optical waveguide is formed by the silicon nitride in the slot. Therefore, the preparation of the silicon nitride waveguide according to the present invention can be compatible with a process for preparing the silicon-based integrated optical chip including the silicon-based optical modulator and the germanium-silicon detector, and a distance between the silicon nitride waveguide and the silicon waveguide may be controlled flexibly, so that controllable coupling strength and coupling loss between the silicon waveguide and the silicon nitride waveguide are implemented; and the silicon waveguide at a bottom layer and the silicon nitride waveguide at an upper layer may be used to design in combination various passive devices with better performance, for example, a coupler with lower coupling loss and a waveguide with lower transmission loss.

4 Claims, 3 Drawing Sheets

SILICON-BASED INTEGRATED OPTICAL CHIP

TECHNICAL FIELD

The present invention relates to the field of optical communication and integrated optics technologies, and in particular, to a silicon-based integrated optical chip.

BACKGROUND

In recent years, silicon-based photon integration is regarded as one of ideal solutions for optical interconnections with a high bandwidth, low power consumption and a low cost. A silicon-based optoelectronic integrated chip based on a silicon-based photon technology may integrate devices such as a multi-channel high-speed modulator, a detector, a wave beam splitter/combiner and a wavelength division multiplexer/demultiplexer, thereby meeting requirements for high-capacity communication, high-speed optical interconnection, and the like. Nevertheless, the silicon-based optoelectronic integrated chip has certain limitations on performance, for example: it is difficult for a silicon material to bear relatively high luminous power due to the influence from two-photon absorption and free carrier absorption effects, thus limiting optical input power of an integrated chip; a slightly high transmission loss of a silicon-based optical waveguide leads to a relatively high on-chip loss, especially a high loss of the integrated chip with a relatively long waveguide and a relatively large area; and a thermo-optical coefficient of the silicon material is relatively large, and performance of the silicon-based wavelength division multiplexer/demultiplexer is easily affected by temperature.

To solve the foregoing technical problems, a person skilled in the art puts forward that a passive device is made from a silicon nitride material, the silicon nitride material has higher tolerance to large optical power and a lower waveguide transmission loss than silicon, and a thermo-optical coefficient of the silicon nitride material is only about one fifth that of the silicon material. A passive optical waveguide device made from the silicon nitride material features higher optical power tolerance and a lower optical waveguide transmission loss, and is insensitive to temperature. However, it is difficult to make high-speed active devices, such as a modulator and a detector, from the silicon nitride material, which causes use scenarios of silicon nitride-based integrated chips to be limited.

Currently, there are two methods for preparing a silicon nitride waveguide on a silicon-based platform generally. The first method is low pressure chemical vapor deposition (LPCVD), which needs a relatively high temperature, generally 600-800° C. The LPCVD is implemented relatively easily during integration with the silicon-based passive devices, but is implemented relatively difficultly during integration with the silicon-based high-speed active devices, for example, obvious adverse impacts may be brought to the preparation of the silicon-based modulator and the germanium-silicon detector. The second method is plasma enhanced chemical vapor deposition (PECVD) which needs a relatively low temperature, generally 200-400° C. The PECVD has no obvious impact on the preparation of the silicon-based modulator and the germanium-silicon detector at the deposition temperature, but the PECVD is a subsequent process which leads to an excessive minimum distance between the silicon nitride waveguide and the silicon waveguide, for example, over 500 nm. This is unfavorable for low-loss conversion between the silicon waveguide and the silicon nitride waveguide, and thus reduces performance of the integrated chip.

SUMMARY

To solve the foregoing technical problems, the present invention provides a silicon-based integrated optical chip. The following provides a brief overview to gain a basic understanding of some aspects of the disclosed embodiments. The overview is not a general review, and is not intended to determine key/important components or describe the protection scope of these embodiments. The only objective thereof is to present some concepts in a simple form as a preface to the detailed explanations that follow.

The present invention employs the following technical solution: The present invention provides a silicon-based integrated optical chip integrating a silicon-based optical modulator and a germanium-silicon detector, including an SOI wafer and an interlayer dielectric deposited on the SOI wafer, where the interlayer dielectric is etched with a slot, and a silicon nitride waveguide is deposited in the slot. Further, the SOI wafer is further provided with a PN junction and a silicon waveguide of the silicon-based optical modulator and a germanium layer of the germanium-silicon detector, and the interlayer dielectric covers the PN junction and the silicon waveguide of the silicon-based optical modulator and the germanium layer of the germanium-silicon detector.

Further, the slot is located above the silicon waveguide of the silicon-based optical modulator.

The present invention further provides a method for preparing a silicon-based integrated optical chip integrating a silicon-based optical modulator and a germanium-silicon detector, including: etching an interlayer dielectric to form a slot; depositing a silicon nitride material on the interlayer dielectric to make the silicon nitride cover the slot; and removing the silicon nitride material other than the slot by grinding, so as to form a silicon nitride waveguide by silicon nitride in the slot. Before the etching an interlayer dielectric to form a slot, the method further includes: preparing a PN junction and a silicon waveguide of the silicon-based optical modulator on an SOI wafer, and growing a germanium layer of the germanium-silicon detector; and depositing the interlayer dielectric and performing chemical-mechanical polishing.

The slot is etched above the silicon waveguide of the silicon-based optical modulator. After the silicon nitride waveguide is formed, the method further includes: depositing silicon dioxide having a certain thickness, and allowing a deposited silicon dioxide layer to cover the PN junction and the silicon waveguide of the silicon-based optical modulator, the germanium layer of the germanium-silicon detector and the silicon nitride waveguide.

The PN junction and the silicon waveguide are prepared on the SOI wafer by using a CMOS process, and growth of the germanium layer of the germanium-silicon detector is completed; and a silicon nitride material is deposited on the interlayer dielectric by plasma enhanced chemical vapor deposition.

The present invention has the following beneficial effects: A position and dimension of a silicon nitride waveguide are defined by a slot formed by using an etching process, then surplus silicon nitride is removed by means of chemical-mechanical polishing, and an optical waveguide is formed by the silicon nitride in the slot. Therefore, the preparation of the silicon nitride waveguide according to the present invention can be compatible with a process for preparing the silicon-based integrated optical chip including the silicon-based optical modulator and the germanium-silicon detector, and a distance between the silicon nitride waveguide and the silicon waveguide may be controlled flexibly, so that a controllable coupling strength and coupling loss between the silicon waveguide and the silicon nitride waveguide are implemented; and the silicon waveguide at a bottom layer and the silicon nitride waveguide at an upper layer may be used to design in combination various passive devices with better performance, for example, a coupler with a lower coupling loss and a waveguide with a lower transmission loss.

DETAILED DESCRIPTION OF EMBODIMENTS

The following description and accompanying drawings fully present specific implementation solutions of the present invention, so that a person skilled in the art can practice them. Other implementation solutions may include structural, logic, electrical, procedural and other variations. Embodiments merely typify possible variations. Unless expressly required, separate components and functions are optional, and the order of operation may be varied. Portions and features of some implementation solutions may be included in, or replaced with, those of other implementation solutions.

Figure 1:
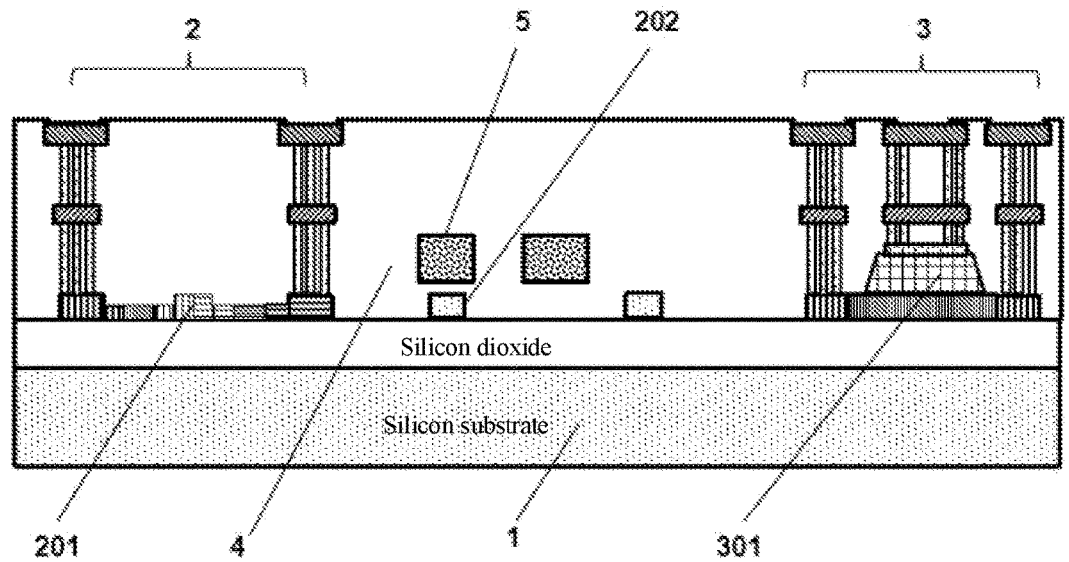
FIG. 1 is a schematic structural diagram of a silicon-based integrated optical chip according to the present invention.

In some illustrative embodiments, as shown in FIG. 1, the present invention provides a silicon-based integrated optical chip integrating a silicon-based optical modulator and a germanium-silicon detector, including: an SOI wafer 1.

The SOI wafer 1 is provided with a PN junction 201 and a silicon waveguide 202 of a silicon-based optical modulator 2 made by using a CMOS process and a germanium layer 301 of a germanium-silicon detector 3. After the PN junction 201, the silicon waveguide 202 and the germanium layer 301 are prepared, an interlayer dielectric 4 is formed by depositing on the SOI wafer 1, that is, the interlayer dielectric 4 is deposited on the SOI wafer 1, and the interlayer dielectric 4 covers the PN junction 201, the silicon waveguide 202 and the germanium layer 301.

The interlayer dielectric 4 is an electrical insulating layer, which serves as an isolating membrane between two layers of conductive metal or adjacent metal wires, and is usually made from a silicon dioxide material having a dielectric constant of 3.9-4.0.

A slot is etched on the interlayer dielectric 4. After the etching is completed, the silicon nitride material is deposited on the interlayer dielectric 4 by plasma enhanced chemical vapor deposition, so that the silicon nitride is deposited in the slot, and thus the silicon nitride deposited in the slot forms the silicon nitride waveguide 5. According to the present invention, a position and dimension of a silicon nitride waveguide 5 are defined by a slot formed by using an etching process, and the slot according to the present invention is etched above the silicon waveguide 202 of the silicon-based optical modulator to control a distance between the silicon nitride waveguide 5 and the silicon waveguide 202 flexibly, thus implementing a controllable coupling strength and coupling loss between the silicon waveguide 202 and the silicon nitride waveguide 5. The silicon waveguide 202 at a bottom layer and the silicon nitride waveguide 5 at an upper layer may be used to design in combination various passive devices with better performance, for example, a coupler with a low coupling loss and a waveguide with a low transmission loss.

The silicon nitride material is compatible with the CMOS process, and features a mature process and a low price. According to the present invention, the good properties of the silicon nitride waveguide are transferred to the silicon-based integrated optical chip for complementing each other's advantages, thus taking advantages of the silicon-based integrated optical chip including a high integration level, a low cost and mass production, but also improving the performance of the passive device in the integrated chip by introducing the silicon nitride. Therefore, the silicon-based integrated optical chip integrating the silicon nitride waveguide according to the present invention is better in performance and stronger in market competitiveness, and thus is necessarily applied to broader applicable scenarios. In some illustrative embodiments, as shown in FIG. 1 to FIG. 6, the present invention further provides a method for preparing a silicon-based integrated optical chip integrating a silicon-based optical modulator and a germanium-silicon detector, including the following steps.

Step 1: Prepare a PN junction 201 and a silicon waveguide 202 of a silicon-based optical modulator 2 on an SOI wafer 1 by using a CMOS process, and grow a germanium layer 301 of a germanium-silicon detector 3 on the SOI wafer 1. The CMOS process is a prior art, and preparations of the PN junction 201, the silicon waveguide 202 and the germanium layer 301 are prior arts. Details are not described herein again.

Figure 2:
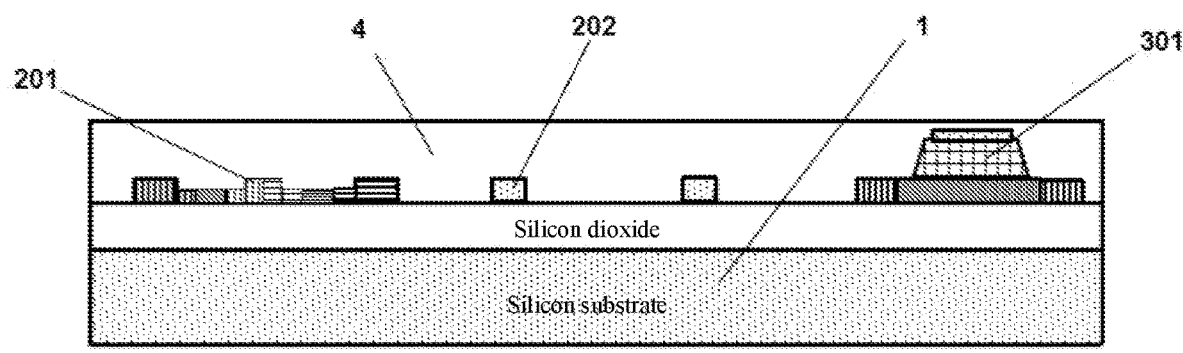
FIG. 2 is a schematic sectional view of a chip after step 2 is finished in a method for preparing a silicon-based integrated optical chip according to the present invention.

Step 2: After the PN junction 201, the silicon waveguide 202, the germanium layer 301 and pins of the germanium-silicon detector 3 are prepared, deposit an interlayer dielectric 4 and perform chemical-mechanical polishing (CMP, Chip multiprocessors), where a formed schematic structural sectional view is shown in FIG. 2.

The interlayer dielectric 4 is an electrical insulating layer, which is usually made from a silicon dioxide material having a dielectric constant of 3.9-4.0.

CMP is a key process to flatten a surface of the wafer during preparation of an integrated circuit. Differing from conventional pure mechanical or pure chemical polishing methods, the CMP process is to remove different micron/nanoscale materials from a surface of the wafer by combining a surface chemical action and a mechanical grinding technology, so as to implement nanoscale planarization of the wafer surface and enable the photoetching process in the next step to be performed. A main operating principle of the CMP is that the polished wafer moves relative to a polishing pad under certain pressure and in the presence of a polishing solution, so that the polished surface of the wafer meets requirements of high flattening, low surface roughness and low defect by highly organic combination between the mechanical grinding action of nanoscale abrasives and chemical actions of various chemical reagents.

Figure 3:
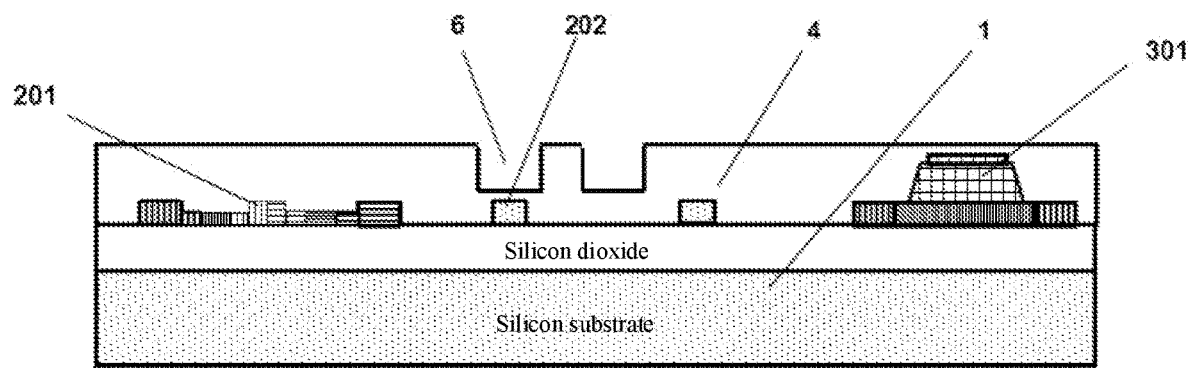
FIG. 3 is a schematic sectional view of a chip after step 3 is finished in a method for preparing a silicon-based integrated optical chip according to the present invention.

Step 3: As shown in FIG. 3, etch the interlayer dielectric 4 to form a slot 6, that is, form the slot 6 by etching the silicon dioxide, where the slot 6 is subsequently filled with a silicon nitride material.

A cross sectional dimension of the slot 6 determines a cross sectional dimension of the silicon nitride waveguide 5.

Figure 4:
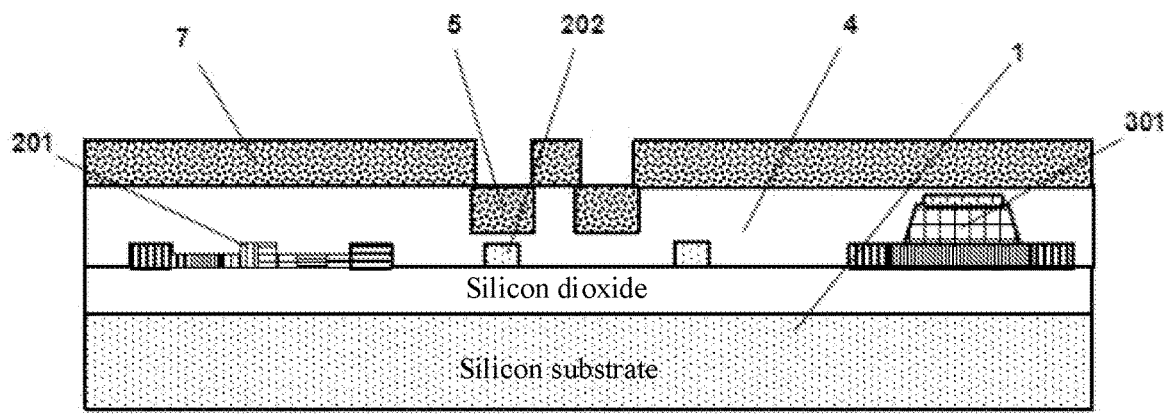
FIG. 4 is a schematic sectional view of a chip after step 4 is finished in a method for preparing a silicon-based integrated optical chip according to the present invention.

Step 4: Deposit a silicon nitride material 7 on the interlayer dielectric 4 by using a PECVD method, as shown in FIG. 4, where the silicon nitride covers the slot 6.

Figure 5:
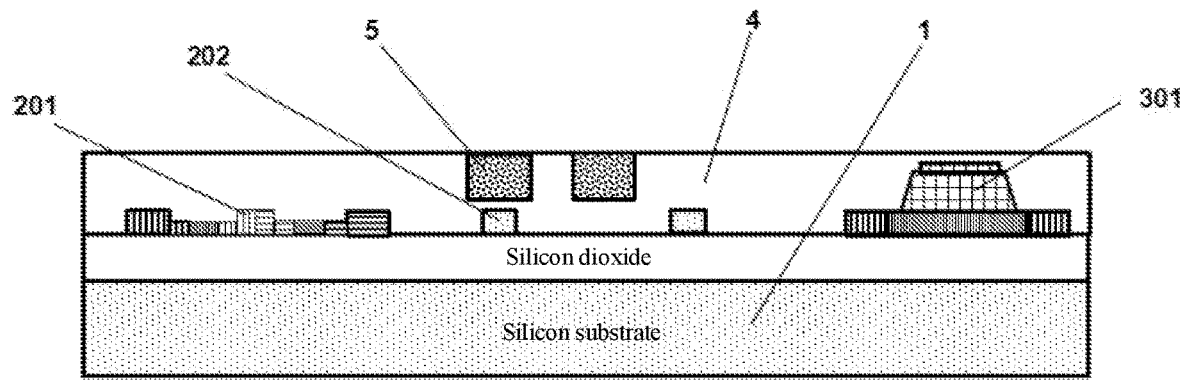
FIG. 5 is a schematic sectional view of a chip after step 5 is finished in a method for preparing a silicon-based integrated optical chip according to the present invention.

Step 5: As shown in FIG. 5, remove the silicon nitride material other than the slot 6 and partial silicon dioxide by grinding, that is, retain only the silicon nitride in the slot 6, so that the silicon nitride in the slot 6 forms a silicon nitride waveguide 5.

Figure 6:
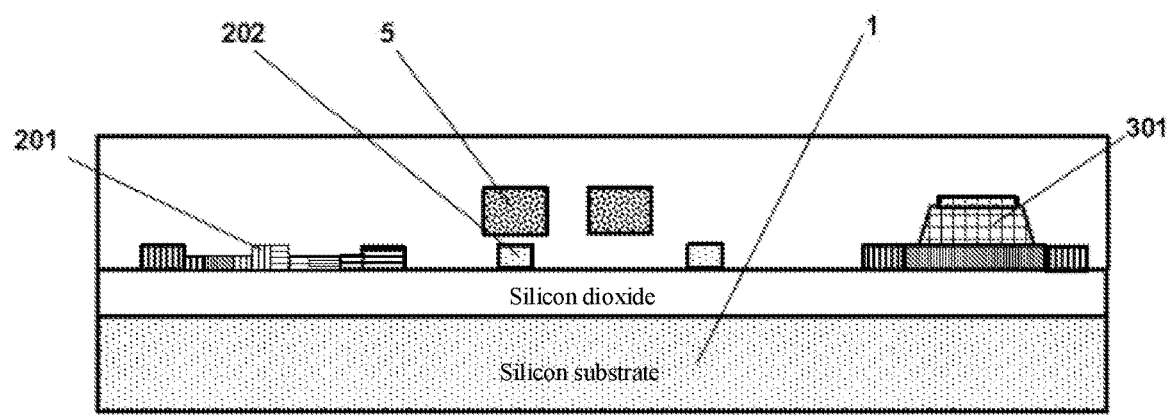
FIG. 6 is a schematic sectional view of a chip after step 6 is finished in a method for preparing a silicon-based integrated optical chip according to the present invention.

Step 6: As shown in FIG. 6, after the silicon nitride waveguide 5 is formed, deposit silicon dioxide having a certain thickness for a subsequent through hole process and electrode preparation, where a deposited silicon dioxide layer has such a thickness that the deposited silicon dioxide layer can cover the PN junction 201 and the silicon waveguide 202 of the silicon-based optical modulator, the germanium layer 301 of the germanium-silicon detector and the silicon nitride waveguide 5. The following procedures mainly include opening a through hole, preparing an electrode, and introducing the CMOS process such as pad. Details are not described herein again. The slot 6 herein is etched above the silicon waveguide 202 of the silicon-based optical modulator.

A silicon nitride deposition process according to the present invention is implemented by using a PECVD method, and is a subsequent CMOS process; and preparation procedures of the silicon nitride deposition process are implemented in the subsequent process after the PN junction of the silicon-based optical modulator and a germanium area of the germanium-silicon detector are grown. The position and cross sectional dimension of the silicon nitride waveguide 5 are defined by virtue of forming the slot 6 by etching, then surplus silicon nitride is removed by the chemical-mechanical polishing, and the optical waveguide is formed by the silicon nitride in the slot 6. A method for preparing the silicon nitride waveguide 5 may be better compatible with technological processes of the silicon-based optical modulator and the germanium-silicon detector, and the silicon nitride waveguide 5 and the silicon waveguide 202 may be designed to be close to each other, which may easily implement a distance less than 200 nm. Therefore, this implements a very low coupling loss between the silicon waveguide 202 and the silicon nitride waveguide 5, and the passive devices with better performance may be designed in combination by using the two layers of optical waveguides.

A person skilled in the art should further understand that electronic hardware, computer software or a combination thereof may be implemented in conjunction with various illustrative logic blocks, modules, circuits and algorithm steps described in the embodiments herein. To illustrate interchangeability between the hardware and the software, various illustrative parts, blocks, modules, circuits and steps have been described above generally in terms of functions thereof. Whether the functions are implemented as hardware or software depends on specific applications and design constraints applied to the entire system. Skilled technicians may implement the described functions in varying ways for each particular application, but such implementation decisions should not be interpreted as a departure from the protection scope of the present disclosure.

What is claimed is:

1. A method for producing a silicon-based integrated optical chip which integrates a silicon-based optical modulator and a germanium-silicon detector therein, comprising:
    producing a PN junction and a silicon waveguide of the silicon-based optical modulator on an SOI wafer, and growing a germanium layer of the germanium-silicon detector;
    depositing an interlayer dielectric on the PN junction, the silicon waveguide and the germanium layer, and performing chemical-mechanical polishing of the interlayer dielectric;
    etching the interlayer dielectric to form a slot;
    depositing a silicon nitride material on the interlayer dielectric so that the slot is filled with a part of the silicon nitride material; and
    removing the silicon nitride material other than in the slot by grinding, so as to form a silicon nitride waveguide by the silicon nitride material in the slot,
    wherein the slot is formed just above the silicon waveguide of the silicon-based optical modulator.

2. The method for producing the silicon-based integrated optical chip according to claim 1, wherein after forming the silicon nitride waveguide, the method further comprising:
    depositing a silicon dioxide material to form a silicon dioxide layer for covering the PN junction and the silicon waveguide of the silicon-based optical modulator, the germanium layer of the germanium-silicon detector and the silicon nitride waveguide.

3. The method for producing the silicon-based integrated optical chip according to claim 2, wherein the PN junction and the silicon waveguide are produced on the SOI wafer by using a CMOS process, while growing the germanium layer of the germanium-silicon detector.

4. The method for producing the silicon-based integrated optical chip according to claim 2, wherein the silicon nitride material is deposited on the interlayer dielectric by a plasma enhanced chemical vapor deposition.

* * * * *